Sept. 27, 1960  E. M. FARR  2,954,243
HITCH CONSTRUCTION
Filed Feb. 25, 1959
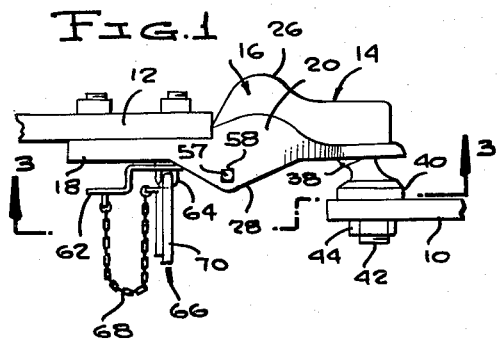
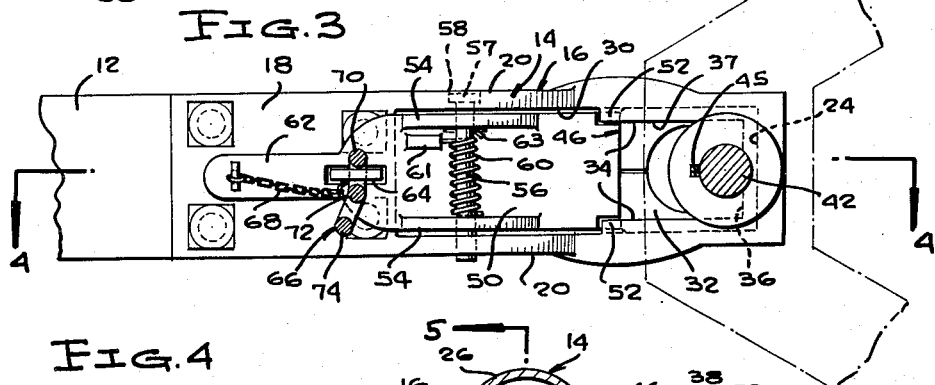
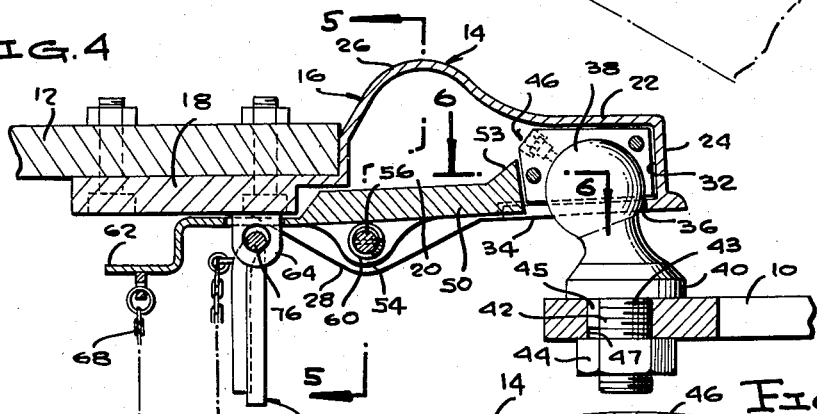
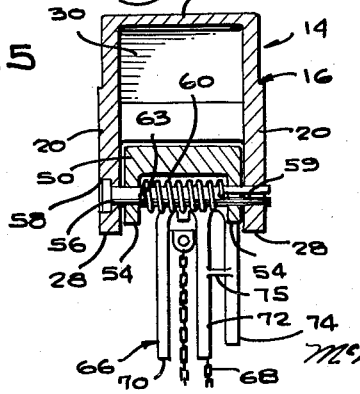
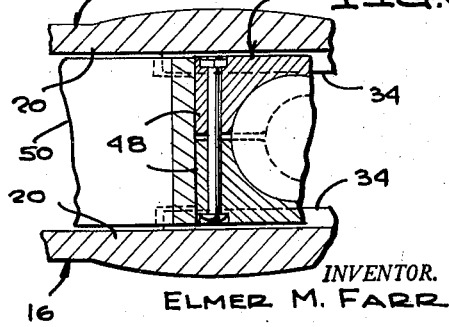
INVENTOR.
ELMER M. FARR
BY
McMorrow, Berman & Davidson
ATTORNEYS United States Patent Office 2,954,243
Patented Sept. 27, 1960

2,954,243

HITCH CONSTRUCTION

Elmer M. Farr, P.O. Box 324, Saratoga, Tex.

Filed Feb. 25, 1959, Ser. No. 795,407

6 Claims. (Cl. 280—512)

This invention relates to the construction of a hitch, and more particularly, to the formation of a generally improved hitch connectible between traction and trailing vehicles.

The present invention, in this regard, constitutes, in certain respects, an improvement on the hitch described and claimed in my co-pending patent application Serial No. 689,534, filed October 11, 1957, now Patent No. 2,884,261. The present application is a continuation-in-part of that application.

In my co-pending application, there is shown a hitch which includes a housing, having a fore part and also having an opening rearwardly from said fore part. The opening is formed in the under side of the housing, and movable into and out of the fore part through said opening is a block or ball housing, comprised of sections connected together about and universally movable in respect to a ball element adapted to be carried by one of the hitch members of the mentioned vehicles. The fore part and the block are so designed as to be interengageable, in the operative, housed position of the block, against relative rotational movement in any direction.

In the co-pending application, further, there is a locking plate pivoted on the under side of the housing, and spring biased to a locking position in which it extends as an abutment limiting the block against movement out of the fore part of the housing. The locking plate, when pivoted from its locking position, lies obliquely across the housing, clear of the block to guide the block out of the fore part and through the opening to effect a disconnection of the traction vehicle from the trailing vehicle. A keeper extends downwardly from the housing, through a slot provided in the mentioned plate when the plate is in the locking or latching position thereof.

In accordance with the present invention, the construction described above is improved upon, by an improved arrangement of the spring that biases the locking plate out of its axis. In accordance with the present invention, the spring is completely out of the way of swinging movement of the locking plate to its unlocking position.

Another improvement found in the present invention resides in the provision of corner clearance notches at the front end of the locking plate, designed to interfit with guide ledges or flanges provided at the under side of the fore part of the housing, when the locking plate is in said locking position thereof.

Another important improvement found in the present invention resides in the particular shape of the housing, which is generally improved in respect to the shape of the housing illustrated and described in my presently pending application.

Another object is to provide an improved, removable, pin that constitutes a pivot, a spring anchor, and connector.

Yet another improvement, in the present application, is found in the provision of a hasp, so designed as to be carried by the keeper or ear that depends from the housing. The hasp is so shaped that it is adjustable upon the ear between two positions. In one position, the hasp is disposed wholly below the locking plate. In this position the hasp limits the plate against movement from the latching or locking position of the plate.

In a second position of the hasp on the ear, it extends transversely of the housing, above the locking plate, being disposed as a spacer between the locking plate and the housing.

The hasp, in this connection, has a pair of side legs, and an intermediate leg portion, with a bight connecting the legs and leg portion. The leg portion extends through the ear in the position assumed by the hasp when it is holding the plate in the unlatching position thereof. The bight of the hasp extends through the ear in the depending, first-named position of the hasp.

Other particular improvements are incorporated in the present construction, as will be apparent from the description to be provided hereinafter.

The main object of the present invention is to provide novel, worthwhile improvements in the construction shown in the hitch illustrated and described in my co-pending application.

Other objects will appear from the following description, the claims appended thereto, and from the annexed drawing, in which like reference characters designate like parts throughout the several views, and wherein:

Figure 1 is a side elevational view of a hitch according to the present invention, in its connected or hitching position, associated hitch members of traction and trailing vehicles being illustrated fragmentarily;

Figure 2 is a side elevational view in which the hitch is shown as it appears when being disconnected from the associated hitch member of a traction vehicle;

Figure 3 is an enlarged horizontal sectional view taken substantially on line 3—3 of Figure 1;

Figure 4 is a longitudinal sectional view on the same scale as Figure 3, taken on line 4—4 of Figure 3;

Figure 5 is a transverse section, on the same scale as Figure 4, taken on line 5—5 of Figure 4; and Figure 6 is a still further enlarged horizontal sectional view taken substantially on line 6—6 of Figure 4.

Referring to the drawing in detail, designated at 10, 12, are hitch members of traction and trailing vehicles respectively. The member 10 constitutes a drawbar and the member 12 constitutes a tongue that would project forwardly from a trailing vehicle, not shown.

The hitch comprising the present invention has been generally designated at 14, and includes an elongated housing 16 extending in a fore-and-aft direction in respect to the traction and trailing vehicles. The housing 16, at one end, is formed with a flat, wide, elongated tongue element 18, which underlies the hitch tongue 12 in face-to-face contact therewith, being bolted or otherwise fixedly, more-or-less permanently secured to said tongue 12.

The housing 16 is formed, forwardly of the tongue element 18, with vertical side walls 20, integral with a top wall 22 and front wall 24. The top wall 22 is formed, rearwardly from the forward extremity of the housing, with a rounded hump 26, for a purpose to be made presently apparent. The side walls 20 include, at their bottom edges, depending, shallowly triangular bearing extensions 28.

Between the extensions 28, the housing is formed with a bottom opening 30, disposed immediately rearwardly of the fore part 32 of the housing. Integrally formed upon the bottom edges of the side walls 20, forwardly of the opening 30, are confronting, longitudinal ledges 34 integral at their forward ends with a transverse front end ledge 36. The ledges 34, 36 cooperate in defining a wide, longitudinal slot 37 communicating with the hollow fore part of the housing.

It is to be noted that the fore part of the housing as substantially rectangular in configuration, both internally and externally thereof.

Designated at 38 is a ball element carried by the drawbar 10, said ball element being integral or otherwise made rigid with a base 40 shouldered to rest upon the top surface of the drawbar. Integral or otherwise rigid with the base 40, centrally thereof, is a depending, threaded stud 42 extending through an opening 43 of smooth walled formation, formed in the drawbar. A key 45 is preferably formed upon the stud, engaging in a complementarily shaped keyway 47 provided in the drawbar in communication with the opening 43. This holds the ball element against rotation from a position in which said ball element is inclined out of the vertical in a direction rearwardly from the drawbar (see Figure 4).

A nut 44 is threaded upon the depending end portion of the stud, against the under side of the drawbar so as to fixedly connect the ball element to the drawbar.

Designated generally at 46 is a ball housing or block, comprising a component of the hitch which is more-or-less permanently connected about the spherically shaped head portion of the ball element. The block 46 comprises confronting block sections 48 bolted or otherwise fixedly secured together and having confronting, partly spherical recesses that cooperate in defining a cavity for the head of the ball element.

Exteriorly, the sections 48 are of a configuration such as to impart to the block 46 an external configuration complementary to the internal configuration of the fore part 32 of the housing. Accordingly, when the block 46 is engaged in the fore part 32, the block and fore part are interengaged in such a way as to hold both of these cooperating components against relative rotation about any axis.

However, the block 46 is universally movable in respect to the ball element 38, this, of course, being desirable to permit a corresponding universal movement of the traction relative to the trailing vehicles, within prescribed limits, during the normal operation of said vehicles over a roadway.

Designated at 50 is a combined cam and locking plate. Said plate, at its forward end, has right-angular corner notches 52 (see Figure 3), shaped to receive the rear end portions of the side ledges 34. Said notches, of course, receive the ledges 34 only when the plate is in its substantially horizontal locking position shown in Figure 4. Between the notches, the plate 50 has a transverse, upstanding rib 53 of generally triangular cross section (see Figure 4), which not only reinforces the plate at its forward end, but also, defines a relatively high abutment engageable against the back surface of the block, in the locking position of the plate. This is shown in Figure 4, and it will be observed that when the block is in the fore part of the housing, it is supported upon the ledges 34, 36. Therefore, the block cannot move straight downwardly out of the fore part. Instead, the block must move rearwardly, substantially horizontally along the side ledges 34 until the block is completely clear of the fore part and is disposed above the opening 30. Then, the block is movable downwardly through the opening 30 in the manner shown in Figure 2 to be completely free of the housing to provide for disconnection of the traction and trailing vehicles from one another.

The plate 50 is so formed as to discharge an important function in respect to movement of the block into and out of the housing in the angular path which the block must follow. To this end, the plate 50 is pivotally mounted, intermediate its ends, upon a generally horizontal axis extending transversely of the housing between the extensions 28. Said axis is defined by a cross pin 56, one end of which is formed with a non-circular head 57 engageable in a complementarily shaped side recess 58 formed in one of the side walls 20. In this way, the pin is held against rotation.

The pin, at its other end, has a longitudinal slot 59.

Pin 56 extends through transversely aligned openings formed in depending plate members or flanges formed upon the opposite sides of the plate 50 (see Figure 3), thus to pivotally mount the plate 50 for movement about the axis defined by the pin 56, between a locking position of the plate shown in Figure 4, and an unlocking position thereof shown in Figure 2.

Designated at 60 is a torsion coil spring. One end of said spring is engaged in the slot 59 of the pin. The other end of the spring extends into a sleeve 61 provided upon the under side of the plate 50. The spring is so tensioned as to normally bias the plate 50 to the locking position thereof shown in Figure 4. However, against the restraint of the spring, the plate can be swung upwardly to its Figure 2, unlocking position. In its unlocking position, the plate further serves as a cam, in a manner to be described in full detail hereinafter.

Adjacent sleeve 51, a cotter pin 63 extends through a transverse opening of pin 56 to hold the pin assembled with the plate 50 and the housing.

Rearwardly from the pin 56, the plate 50 is formed with a downwardly offset end portion, designated at 62, and designated at 64 is a depending, apertured ear rigid with the under side of the tongue element 18 of the housing.

At 66, I have generally designated a hasp, which is adjustable between first and second positions thereof shown in Figures 1 and 2 respectively. The hasp 66 is provided with a ring, connected to one end of a chain 68, the other end of which is connected to the downwardly offset end portion 62 of the plate 50.

The hasp is constructed in a manner shown to particular advantage in Figures 4 and 5. As will be noted from Figure 5, the hasp includes a side leg 70, a leg portion 72, and a side leg 74 connected by a web 75 to the leg portion 72. A bight 76 is integral with and connects the legs and leg portion.

It may be noted that the leg portion and the legs 70 are coextensive in length and are in a common plane (see Figures 3 and 5). The leg 74 is offset rearwardly from said plane, as shown in Figure 3, this particular shape of the hasp being found desirable when the hasp is in the Figure 2 position thereof.

In any event, when the hasp is being used in the manner shown in Figures 1, 4, and 5, the bight 76 thereof extends through the aperture of the ear 64. In these circumstances, the hasp depends from the ear 64, wholly below the locking plate 50. The hasp thus limits the locking plate against swinging movement from its locking position shown in Figure 1.

If, however, it is desired to adjust the locking plate to its unlocking position, to free the block 46 for movement out of the housing, one disengages the hasp from the ear, and swings the locking plate to the Figure 2 position thereof. The hasp is now re-inserted in a transverse direction, in the Figure 2 position. In these circumstances, the leg portion 72 extends through the aperture of the ear and the legs 70, 74 engage the housing and locking plate respectively. The hasp thus now constitutes a spacer-type abutment, which limits the locking plate 50 against swinging movement from its Figure 2, unlocking position.

In the Figure 2 position of the locking plate, it is clear of the block 46, thus freeing the block for movement out of the fore part in a rearward direction.

In use, and assuming that the vehicles are to be disconnected, the trailer may be jacked up slightly to elevate the hitch to the Figure 2 position. This causes the trailing vehicle to be so located that the traction vehicle tends to depend therefrom. In other words, there is a positive downward pull upon the block, tending to move the same downwardly out of the housing.

With the locking plate 50 adjusted to the Figure 2 position and locked therein by the hasp, one now moves the traction vehicle rearwardly in Figure 2, so that the block 46 is directed against the locking plate 50. Locking plate 50, at this time, is obliquely disposed in respect to the path of movement of the block out of the fore part of the housing, and is positioned transversely of the housing. Therefore, the locking plate constitutes a cam, which will engage the block and cammingly bias the same downwardly out of the opening 30. The block, at its rear end, has a beveled surface 80 so shaped as to engage the cam at this time to cause the block to be changed in direction so far as its path of movement is concerned, and moved out of the fore part of the housing through the opening to completely disconnect the vehicles.

The particular formation of the rounded hump of the housing is such as to facilitate the movement of the locking plate to its Figure 2 position. Further, movement of the locking plate fully to its Figure 2 position is facilitated by the location and arrangement of the spring relative to the locking plate and housing.

The inclination of the ball element is designed to allow the block to drop further down at the back thereof, thus making it easier to connect and disconnect.

It will be apparent that the hitch comprising the present invention incorporates highly desirable safety features, particularly with reference to the hasp. Further, the hitch has the desirable characteristic of insuring a positive locking of the traction and trailing vehicles against accidental separation, and at the same time, it is clear that a tamper-proof connection can be effected. Usable in association with the hasp is a conventional padlock, not shown, of course, to prevent unauthorized separation of the traction and trailing vehicles from one another.

Still further, the present invention is characterized by the trouble-free, efficient operating characteristics thereof both during the connection and disconnection of the vehicles, and by the relatively low cost of manufacture, considered in relation to the pronouced durability of the device.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any changes in construction that may be permitted within the scope of the appended claims.

What is claimed is:

1. A trailer hitch for connection between hitch members of traction and trailing vehicles, one of said members including a ball element, comprising: an elongated housing extending in a fore-and-after direction and having an opening rearwardly from the fore part of the housing; a block movable into and out of said fore part through the opening and adapted for connection about and for universal movement in respect to the ball element; a combined locking and cam plate pivoted on the housing for movement between a first position in which said plate extends as an abutment limiting the block against movement out of said fore part, and a second position in which the plate is located clear of the block to free the same for movement out of the fore part of the housing, the plate in the second position thereof lying obliquely to the length of the housing in position to cammingly bias the block out of the housing through said opening; an ear on the housing, said plate having a slot receiving the ear in the locking position of the plate; and a hasp carried by the ear and adjustable thereon between two positions in one of which the hasp retains the plate in said first position thereof and in the other of which the hasp retains the plate in said second position thereof.

2. A trailer hitch for connection between hitch members of traction and trailing vehicles, one of said members including a ball element, comprising: an elongated housing extending in a fore-and-aft direction and having an opening rearwardly from the fore part of the housing; a block movable into and out of said fore part through the opening and adapted for connection about and for universal movement in respect to the ball element; a combined locking and cam plate pivoted on the housing for movement between a first position in which said plate extends as an abutment limiting the block against movement out of said fore part, and a second position in which the plate is located clear of the block to free the same for movement out of the fore part of the housing, the plate in the second position thereof lying obliquely to the length of the housing in position to cammingly bias the block out of the housing through said opening; an ear on the housing, said plate having a slot receiving the ear in the locking position of the plate, said ear having an aperture; and a hasp carried by the ear and adjustable thereon between two positions in one of which the hasp has a bight extending through the aperture, the hasp when in said one position thereof retaining the plate in the first position of the plate, the hasp in its other position of adjustment having a leg extending through the aperture, said hasp when in its other position retaining the plate in the second position of the plate.

3. A hitch connectible between hitch members one of which includes a ball element, comprising: a housing connectible to the other member and having a fore part and an opening rearwardly from the fore part; a block movable through the opening into the fore part and connectible about the ball element; a plate pivoted on the housing for movement between first and second positions in which, respectively, the plate limits the block against movement out of the fore part and frees the block for said movement, the plate in the second position lying transversely of the housing obliquely to the path of movement of the block out of the fore part in position to cammingly bias the block out of the housing through said opening; an ear on the housing, said plate receiving the ear in the first plate position; and a hasp carried by and adjustable on the ear between one position limiting the plate against pivotal movement from the first position of the plate, and another position limiting the plate against pivotal movement from the second plate position.

4. A hitch as in claim 3, wherein said ear depends from the housing, the plate having a longitudinal slot receiving the ear in the first plate position, said hasp being suspended from the ear when the hasp is disposed to limit the plate against movement from the first plate position, said hasp being extended transversely of the ear between the housing and plate when disposed to limit the plate against movement from the second plate position.

5. A hitch as in claim 4, wherein the hasp includes a bight portion extending through the ear in the first-named position of the hasp, and a leg portion extending through the ear in the second-named position of the hasp.

6. A hitch as in claim 5, wherein the hasp includes a pair of legs disposed at opposite sides of and extending in substantially parallel relation to said leg portion with the bight connecting said leg portion and legs, the legs of the hasp being in engagement with the housing and plate respectively when the leg portion extends through the ear in the second-named position of the hasp.

References Cited in the file of this patent

UNITED STATES PATENTS 2,884,261    Farr                  Apr. 28, 1959